United States Patent [19]

Fong

[11] 4,033,555
[45] July 5, 1977

[54] FLUIDIZED BED FOR TREATING GRANULAR MATERIAL

[75] Inventor: Leong Q. Fong, San Jose, Calif.

[73] Assignee: The Motch & Merryweather Machinery Company, Hayward, Calif.

[22] Filed: Dec. 4, 1974

[21] Appl. No.: 529,981

Related U.S. Application Data

[63] Continuation of Ser. No. 359,057, May 10, 1973, abandoned, which is a continuation of Ser. No. 105,372, Jan. 11, 1971, abandoned.

[52] U.S. Cl. .................... 259/4 R; 259/DIG. 17
[51] Int. Cl.² .................................. B01F 15/00
[58] Field of Search ....... 259/4, 18, 36, 60, DIG. 7; 261/114 JP; 302/31

[56] References Cited
UNITED STATES PATENTS

| | | | |
|---|---|---|---|
| 3,305,619 | 2/1967 | Futer | 34/10 |
| 3,417,975 | 12/1968 | Williams | 261/114 JP |
| 3,733,056 | 5/1973 | Fong | 259/4 |

FOREIGN PATENTS OR APPLICATIONS

| | | | |
|---|---|---|---|
| 1,917,047 | 11/1969 | Germany | 34/57 A |

*Primary Examiner*—Harvey C. Hornsby
*Assistant Examiner*—Robert Pous
*Attorney, Agent, or Firm*—Patrick J. Walsh

[57] ABSTRACT

The bed includes a deck having a plurality of openings and side walls defining a trough with the deck. A plenum below the deck supplies air through the openings for fluidizing material in the trough, the openings being arranged to direct air in a manner to establish a predetermined flow pattern for circulating and mixing the material. In one form hereof, the flow direction is transversely of the bed to provide a circular mixing action. In another form, the openings are configured to provide both transverse and horizontal components of flow whereby the material is circulated as it moves downstream through the trough.

21 Claims, 14 Drawing Figures

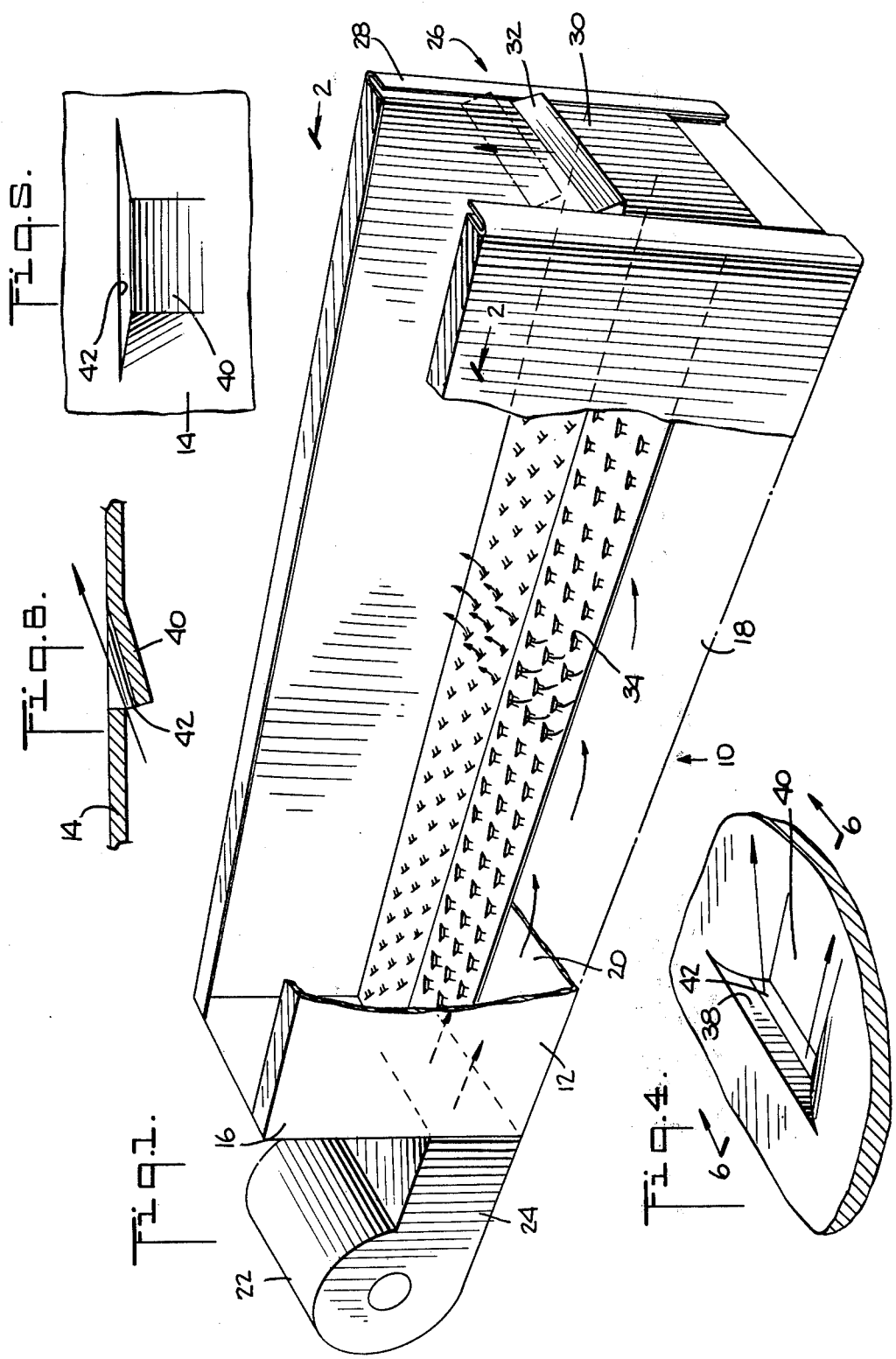

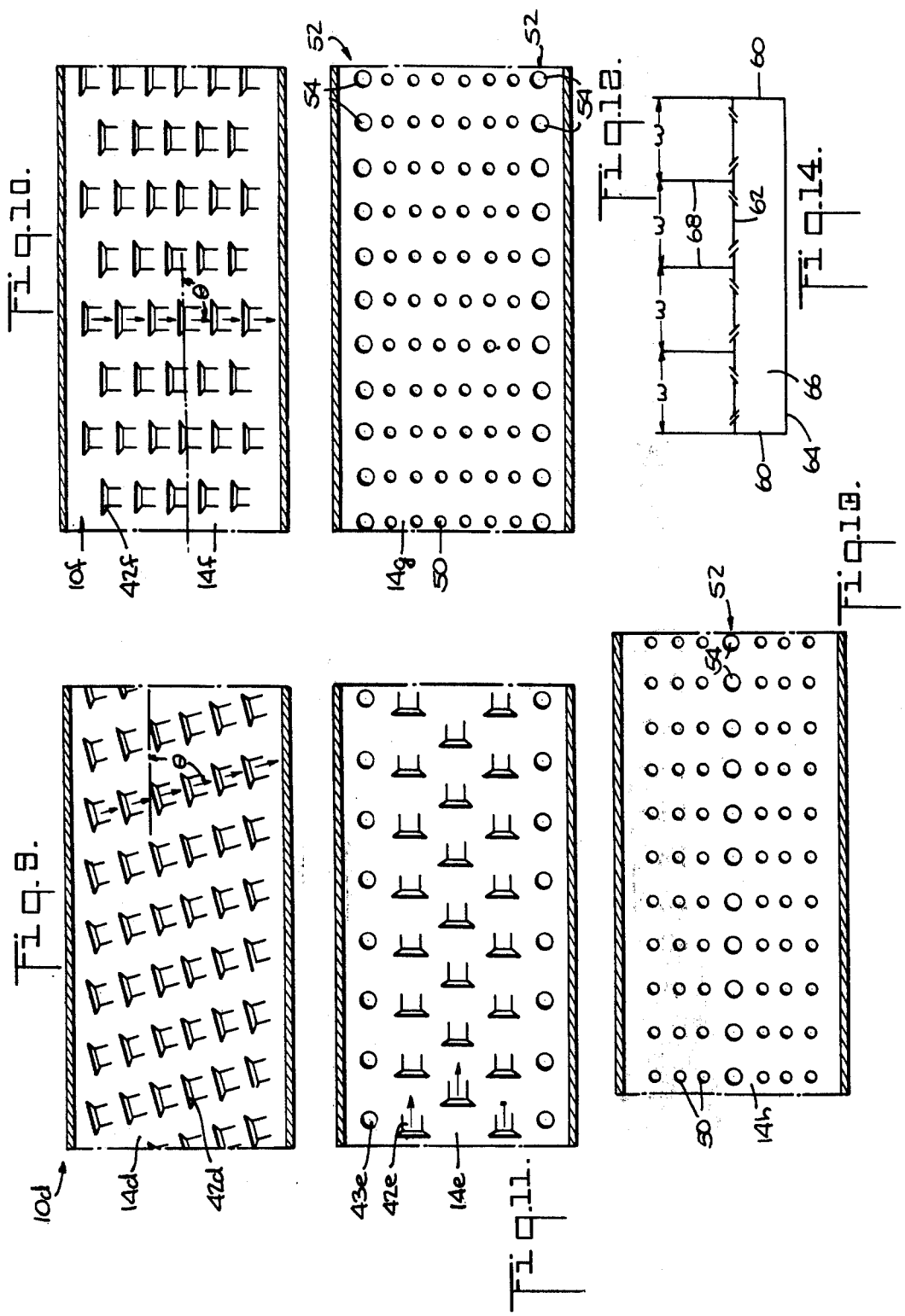

FLUIDIZED BED FOR TREATING GRANULAR MATERIAL

This application is a continuation of application Ser. No. 359,057, filed May 10, 1973, now abandoned, which is a continuation of application Ser. No. 105,372, filed Jan. 11, 1971, now abandoned.

The present invention relates to fluid beds more particularly to a materials handling bed for conditioning particulate or granular material. Fluid beds are constructed to include a tank or trough for receiving granular material for the purpose of conditioning the material. For example, the fluid bed may serve to dry, heat, cool, mix or chemically condition a granular material. To accomplish the conditioning action, the bottom deck of the trough is furnished with a perforated bottom deck through which a gas flows to mix or condition the material. A suitable fan and plenum chamber supply the gas which flows through the perforated deck. In operation, the gas flowing through the deck into the tank flows upwardly through the interstices of the granular material to create a fluidized condition; i.e., the granular material in the fluidized condition behaves like a liquid or fluid mass and flows out of the trough in relation to the quantity flowing in.

The use of fluid beds for treating granular material has heretofore been generally limited to those granular materials which are free flowing and are readily fluidized when placed in a fluid bed. There are materials which are not free flowing and tend because of surface stickiness to cling particle to particle and resist the fluidizing action of the fluid bed. Flaky materials are not free flowing and tend to shingle in a manner which resists the fluidizing action of a fluid bed.

When difficult or non-free-flowing granular material is introduced into a fluid bed, the gaseous medium flowing through the perforated bottom plate tends to form pockets in the granular material at the interface between the bottom plate and the material laying on the bottom plate. The surface of the pocket becomes lined with the granular material adhered together. This condition results in a spout or geyser extending from the pocket thus formed and the upper surface of the bulk material through which spout or channel the gaseous material flows without treating or fluidizing the non-free-flowing granular material. This condition is known as short circuiting in that the gas passes through the granular material without fluidizing it. The consequence is the non-free-flowing granular material cannot be effectively treated in the fluid bed.

The present invention provides a fluid bed for conditioning free flowing and non-free-flowing granular materials. Some granular materials such as solid beads, cubes or spherical grains are normally free-flowing and are readily fluidized in a fluid bed. Other granular materials, however, are non-free-flowing due to the surface condition of each particle and the granular material tends to stick particle to particle and therefore resists fluidizing action. For example, grains of sand in a wet condition tend to stick or clump together and resist fluidizing action. If the moisture is removed from the sand, the sand does not stick or clump and is easily fluidized. Other materials such as blanched cut corn tend to stick particle to particle because of the presence of sugar and starch on the surface of the corn. In this condition the blanched cut corn will stick particle to particle and resist fluidizing action in a fluid bed.

The present invention provides a bed including a deck having a plurality of openings and a pair of side walls defining with the deck a trough for receiving the material undergoing conditioning. A plenum, supplied with gas from a blower, is disposed below the deck for the purpose of transmitting the gas through the openings and into the material in the trough thereby fluidizing the material.

According to the present invention a fluid bed having a deck with openings arranged to agitate the granular material will overcome the tendency of the granules to stick together. More particularly, the fluid bed according to the present invention provides for agitation of the granular material at the interface between the deck and the bulk material so to prevent the formation of air or gas pockets at the deck bulk material interface. The openings in the deck are arranged to agitate the bulk granular material at the interface to prevent the formation of such pockets or to collapse such pockets as may form. By eliminating the air or gas pockets there is a reduced tendency to spout or form geysers so that the gas will produce the desired fluidizing action for proper treatment of the material in the fluid bed.

According to the present invention the openings in the deck may be arranged in several ways to provide the desired interface agitation and circulation of the granular material. In one form the fluid bed may be provided with a slotted deck in which the slots direct air along the surface of the plate. In another form of the invention the deck surface may be curved concavely upwardly and may include directed slots to provide agitation of the granular material along the surface of the deck. In still another form of the present invention the deck may be arranged with openings of one size arranged in any desired pattern along the surface of the deck and may have in addition one or more rows of larger openings adjacent the side walls of the fluid bed trough. The larger openings may also be arranged along the centerline of the deck.

The opening patterns stimulate circulation and create controlled sprouting of the material in the vicinity of the side walls of the tank and by virtue of such controlled spouting internal circulation of the material is provided in the fluid bed so as to achieve the desired fluidization of the granular material. In inducing such controlled spouting the gas agitates and circulates the granular material to prevent it from sticking together. The fluid bed according to the present invention is particularly useful in fluidizing non-free-flowing granular material such as wet sand.

In carrying out the present invention it has been determined that good results may be obtained in linear fluid bed units by selecting a height/width ratio of the fluid bed within certain limits. The height refers to the depth of bulk material in the unfluidized condition in the fluid bed. The width is the transverse dimension across the fluid bed; i.e., measured transversely of the centerline. The height/width ratio of the fluid bed should be greater than 0.2 but not greater than 1.5.

Furthermore, another aspect of several forms of the present invention provides a fluidized bed with vertical mixing having in conjunction therewith a self-cleaning action. To this end, the openings in the bed are configured to have a flow component directed downstream of the bed whereby the fluidizing gas also acts to drive the residual material toward the delivery end of the trough after a fluidizing operation has been completed and it is desired to clean whatever residue remains in the trough.

According to the present invention a method is disclosed for treating granular material such as hot sand. According to present practice for cooling and drying, as for example sand which may be used in a foundry operation, it is necessary to convey the hot granular material to an agitating conveyor, to use water for cooling the sand, and thereafter to introduce sand into a fluid bed for further cooling and drying of the sand in a fluid bed. According to the method of the present invention it is now possible to cool hot foundry sand without the need for an agitating conveyor. In the method of the present invention, hot sand is introduced into the fluid bed of the present invention, and while in the bed is cooled with a liquid spray such as cool water. A fluidizing gas is then used to fluidize the wet sand to complete the cooling process and to dry the sand to a desired moisture level.

Accordingly, it is a primary object of the present invention to provide a novel and improved fluidized bed for materials handling and treatment.

It is another object of the present invention to provide a novel and improved fluidized bed wherein clearly defined flow patterns are established resulting in a fluid bed capable of handling free flowing as well as non-free-flowing materials.

It is still another object of the present invention to provide a novel and improved fluidized bed for materials handling and treatment which obtains a self-cleaning action.

It is an object of the present invention to provide a method of treating granular material.

These and further objects and advantages of the present invention will be more apparent upon reference to the following specification, appended claims and drawings wherein:

FIG. 1 is a perspective view of a fluidized bed constructed in accordance with the present invention and having parts broken out for ease of illustration;

FIG. 3 is a fragmentary horizontal cross sectional view of the bed illustrated in FIG. 1;

Figure 8:
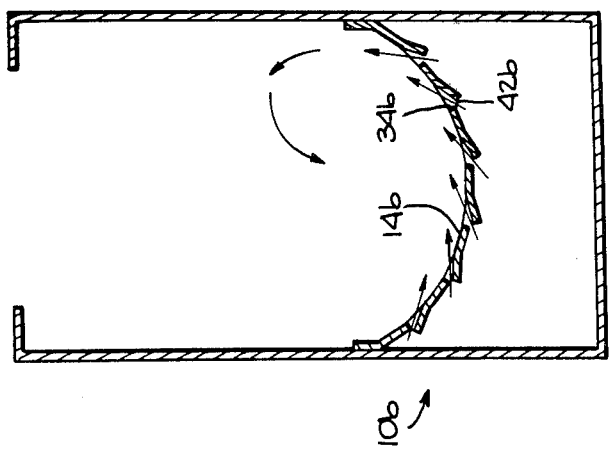
Figure 7:
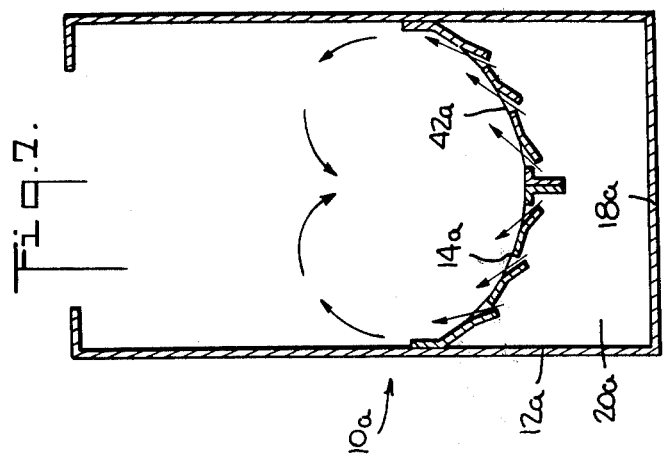
Figure 9:
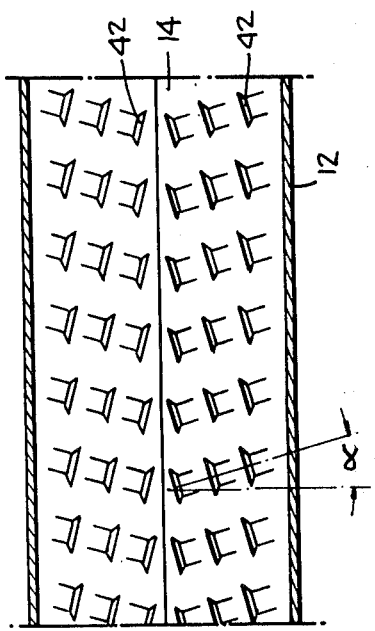
Figure 2:
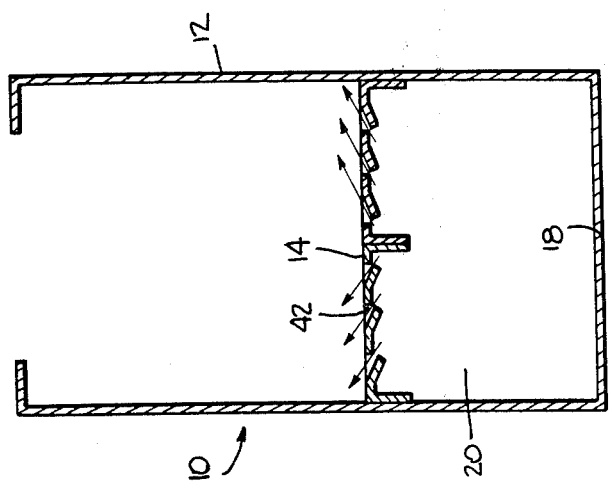
FIG. 2 is a cross sectional view thereof taken generally about on line 2—2 in FIG. 1.

FIG. 4 if a fragmentary perspective view of an opening in the bed;

FIG. 5 is a plan view of the opening illustrated in FIG. 4;

FIG. 6 is a cross sectional view thereof taken generally about on line 6–6 in FIG. 4;

FIG. 7 is a vertical cross sectional view of a further form of fluidized bed hereof;

FIG. 8 is a view similar to FIG. 7 illustrating a still further form of the invention hereof;

FIGS. 9 and 11 are fragmentary plan views of different arrangements of directional slots in the deck of a fluidized bed having a self cleaning action;

FIGS. 10, 12 and 13 are fragmentary plan views of various arrangements of the openings in the decks of a fluidized bed wherein increased mixing action is obtained; and FIG. 14 is a schematic section view of a modified fluid bed in which the bed is divided by longitudinal extending separator plates to form separate plates to form separate channels or sections in the fluid bed.

Referring now to the drawings, particularly to FIG. 1, there is illustrated a fluidized bed generally indicated 10 comprised of side walls 12, a generally horizontally extending deck 14 disposed between side walls 12 and intermediate the height thereof, a rear wall 16, and a bottom wall 18. A plenum 20 is formed with the lower portions of side walls 12 and rear wall 16, deck 14 and bottom wall 18. An air blower 22 is provided adjacent the inlet end of bed 10 and supplies air to plenum 20 through a supply duct 24. It will be appreciated that the area above deck 14 and between the upper portions of side walls 12 and rear wall 16 defines a trough for receiving material subject to treatment in bed 10. A weir gate, generally indicated 26, is provided at the outlet end of the trough and includes a pair of vertically extending channel members 28 on opposite sides of the trough. Members 28 provide a guide in which a weir gate plate 30 slides, the plate 30 carrying an upper lip 32.

A plurality of openings 34 are provided in deck 14 for transmitting as from plenum 20 into the trough defined above deck 14 for the purpose of fluidizing the material in the trough. It is a particular feature hereof that the openings 34 are configured to circulate the material disposed in the trough in a predetermined pattern of flow whereby agitation of the material is increased and a substantially uniform mixing action obtained.

In the forms of the invention illustrated in FIGS. 1 to 10 and 11 the fluid bed deck 14 is arranged with openings to direct the flow of gas along the surface of the bed to provide agitation of the interface layer and circulation of the material to prevent the formation of spouts and short circuiting of the fluid through the spouts.

In the form hereof illustrated in FIGS. 1 – 6, openings 34 are configured to provide directional slots whereby the gas issuing through openings 34 from plenum 20 has flow components directed predominantly laterally towards the side walls 12 of the trough. Particularly, and as illustrated in FIGS. 4 – 6, each directional slot 34 is formed by incising deck 14 to form a slit 38 extending normal to the direction of the desired flow and depressing the portion 40 of the deck 14 in front of the slit 38 in the direction of the desired flow whereby a nozzle or slot 42 is formed. The depressed portion 40 and slot 42 cooperate to direct the gas jet issuing through opening 34 in the desired direction substantially normal to incision 38 and in a direction having a predominantly horizontal flow component. In the arrangement of the openings 34 disclosed in FIGS. 1 and 3, directional slots 42 are arranged in two groups of a plurality of longitudinally extending rows each wherein a group of rows of such slots on each side of the centerline of deck 14 are arranged to direct the gas jets issuing therefrom predominantly laterally toward the near side wall 12 and slightly forwardly in a direction toward weir 26. That is to say, the slots 42 are arranged in a herringbone pattern in plan view. In this manner, the gas jets are directed predominantly toward the opposite side walls and in a slightly forward and upward direction. This orientation of the openings causes the gas to percolate upwardly through the fluid bed to produce the fluidized condition of the granular material in the bed. A portion of the gas is directed toward the side walls 12 and results in a uniform, controlled spouting action along the sides of the bed. This flow pattern of the gas induces a circulation of the granular material from the bottom of the bed outwardly and upwardly along the side walls. This flow action is indicated by the arrows in FIG. 2.

In use the material undergoing treatment is disposed on deck 14 in the trough. Upon being received in the trough, the material is fluidized by the gas jets issuing through directional slots 42 and obtains a flow pattern and fluidizing action first described. The circulatory motion imparted to the material affords increased uniformity of mixing and increased agitation of the material. When a fluidized condition is achieved the flow rate through the bed is established such that flow in equals flow out. Outward flow occurs over the weir 26.

Furthermore, the herringbone arrangement of the directional slots 42 illustrated in FIGS. 1 – 6 provides a fluidized bed which obtains a self-cleaning action. The small longitudinal component of the gas jets issuing through directional slots 42 provides for movement of the material in the trough downstream toward weir 26. Thus the entirety of a specified material can be disposed for treatment in the bed with the assurance that the flow patterns obtained by directional slots 42 in the bed also clean the bed when the end of a fluidizing operation with a particular material. After the main bulk of material is removed by the fluid flow action, the gas jets will remove residual grains through the lowered weir. It has thus been found that this particular pattern of directional slots not only provides an effective mixing and agitating action but also a self-cleaning action. Preferably, directional slots 42 are arranged in the foregoing described herringbone pattern with the direction of the gas jets preferably extending about 85° from the longitudinal axis of the bed. The complement of this angle, i.e., 5°, is indicated at alpha in FIG. 3.

In the form hereof illustrated in FIG. 7, there is provided a fluidized bed 10a similar in all respects with the fluidized bed 10 described previously with the exception of the shape of deck 14a. In this form, deck 14a is arcuate with its upper surface being concave. Preferably, deck 14a forms the surface of a cylinder with its axis extending longitudinally of the trough. The directional slots 42a are provided in arcuate deck 14a in a herringbone pattern similarly as previously described. That is to say, the slots are configured such that the gas jets issuing therethrough and from plenum 20a have a predominantly lateral component of force and a small downstream or longitudinally extending component of force. As noted previously, flow pattern of the gas results in a uniform, controlled spouting action along the sides of the trough which induces a circulation and agitation of granular material as indicated by the arrows in FIG. 7. Thus increased agitation and fluidizing of non-free-flowing granular material is obtained. It will be noted that, by providing an arcuate deck 14a, the self-cleaning action is particularly effective as sharp angularly related surfaces are substantially avoided.

In the form hereof illustrated in FIG. 8, there is disclosed a fluidized bed 10b similar to the bed 10a illustrated in FIG. 7 and having a similar arcuate deck 14b. In this form, however, the directional slots 42b are configured such that the gas jets issuing therefrom are directed against one of the side walls and have a small longitudinally extending flow component. The approximately circular flow pattern obtained in this form defines an agitation and circulation of material toward the side wall in the flow path as indicated by the arrows in FIG. 8.

In the form hereof illustrated in FIG. 9, there is disclosed a fluidized bed 10d similar to the bed 10 peviously described and having a deck 14d disposed in a horizontal plane. Deck 14d has a plurality of directional slots 42d arranged in diagonally extending rows of slots wherein the gas jets issuing there through from an underlying plenum are directed predominantly against one side wall of the trough. Preferably, the gas jets issue in a direction on an angle approximately 85° from the longitudinal axis of the trough and accordingly have a small longitudinal flow componet. The flow pattern obtained approximates that described in connection with FIG. 8. If desired, the deck 14f (FIG. 10) may be flat and provided with openings 42f which are directed transversely of the centerline of the trough so that the angle is approximately 90°. This configuration induces an agitation and circulation of granular material.

In the form illustrated in FIG. 11, the deck 14e has a plurality of longitudinally extending rows of directional slots 42e configured such that the gas jets issuing therefrom are directed in a longitudinal direction. Flanked on either side of these longitudinal rows of directional slots 42e is a row of vertical holes 43e arranged such that the gas jets issuing therefrom are directed vertically near the side walls. The gas jets issuing from holes 42e and 43e cause controlled spouting along walls and resulting vertical mixing of the granular material.

Referring now to FIGS. 12 and 13 the fluid bed deck 14g and 14h (respectively) may be provided with a number of rows of transversely extending rows of relatively small holes 50. These rows are spaced longitudinally and cover substantially the full length of the deck. In FIG. 12 the rows of smaller holes are flanked on each side by a row 52 of relatively larger holes 54 positioned adjacent each side wall of the trough. In operation the gas issuing from the larger holes is directed upwardly so as to produce the desired controlled spouting action in the vicinity of the side wall thereby inducing agitation and circulation as well as vertical mixing of the granular material. In the form shown in FIG. 13 a row 52 of larger holes 54 may extend along the center line of the deck so as to produce the agitation and circulation of the material along the center line of the trough so as to produce the mixing desired of the granular material.

The openings in the decks in FIGS. 12 and 13 are preferably vertically extending circular holes cut into the surface of the deck plate. Preferably, the diameter of the larger holes are twice the diameter of the smaller holes.

In carrying out the present invention it has been determined that good results may be obtained in linear fluid bed units by selecting a height/width ratio of the fluid bed within certain limits. The height refers to the depth of the bulk material in the unfluidized condition in the fluid bed. The width is the transverse dimension across the fluid bed; i.e., measured transversely of the centerline. The height/width ratio of the fluid bed should be greater than 0.2, but not greater than 1.5. A value for the height/width ratio of 0.5 is preferred. Generally it has been found desirable to limit the width of the fluid bed to approximately one foot. The height/width ratio in practice will depend on the desired material flow rate as well as power requirements. If the fluid bed designed is to be greater than one foot in width, then it is desirable to provide longitudinally extending separating plates to provide a channel for each one foot of width of the fluid bed as shown in FIG. 14.

In this view, the fluid bed includes side walls 60, a deck 62 and a bottom wall 64. A common plenum 66 is defined by the deck, the lower portion of the side walls and the bottom wall. A fan (not shown) supplies gas to the plenum. In order to keep the width/height ratio in the range between 0.2 and 1.5 and the maximum width to about 1 foot, an appropriate number of separator plates 68 may be arranged longitudinal of the trough.

The present invention provides a method for conditioning hot granular materials such as foundry sand. It has been heretofore necessary to utilize the combination of sand handling devices for agitating and cooling hot sand. According to the method of the present invention, the sand may be completely cooled in a fluid bed selected from the embodiments of the invention described above. According to the method, hot granular material such as foundry sand at a temperature of up to 250° to 450° F is dumped in the fluid bed and is sprayed with a cooling liquid such as water. Gas preferably air at ambient temperature is introduced into the fluid bed and the sand is fluidized to complete the cooling and drying of the sand. In using a fluid bed according to the present invention the gas jets, being arranged to provide agitation of the interface layer of sand, overcome the tendency of the wet sand to clump together and achieve fluidization of the wet sand. When fluidized, the wet sand is easily cooled and dried. This method may be carried out with other hot, wet granular materials which because of their wetness or other surface condition are non-free-flowing. With some materials large quantities of surface moisture or even force liquid can be processed in the fluid bed of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, an all changes which come within the meaning and range or equivalency of the claims are therefore intended to be embraced therein.

What is claimed and desired to be secured by United States Letters Patent is:

1. A fluidized bed for treating granular material with a gas comprising a deck plate, a plurality of side wall members extending along the deck plate to define a fluid bed chamber for receiving said material, a plenum chamber underlying said deck plate, means for supplying gas under pressure to said plenum chamber, a plurality of openings in said deck plate arranged in at least one row extending along and in spaced relation to one of said side wall members, each of said openings being formed by an incision through the deck plate with the deck plate displaced on one side of the incision to define the opening, each opening for issuing pressurized gas from the plenum in the form of a gas jet, each gas jet being formed to flow in a unitary stream with a predominant flow component along the surface of the deck plate, said plurality of openings lying in at least one row extending along and in spaced relation to a side wall member, the openings in said row being oriented to direct its gas jet toward said side wall member to induce circulation of the material from the bottom of the bed outwardly and upwardly along the said side wall and to provide substantially uniform mixing action and uniform controlled spouting.

2. A fluidized bed as defined in claim 1 in which said deck plate has at least one row of said openings extending along and in spaced relation to each side wall member.

3. A fluidized bed as defined in claim 1 in which said openings are oriented to issue gas jets in a direction forming an angle of approximately 85° with respect to a centerline of the deck plate.

4. A fluidized bed as defined in claim 3 in which said angle is between 90° and a value greater than zero.

5. A fluidized bed as defined in claim 3 in which said angle is between 90° and 45°.

6. A fluidized bed as defined in claim 3 in which said angle is between 90° and 75°.

7. A fluidized bed as defined in claim 1 in which the transverse dimension ($w$) of the bed and the height of material in the bed ($h$) form a height/width ratio ($h/w$) of between 0.2 and 1.5.

8. A fluidized bed as defined in claim 7 in which the width is not greater than approximately than 1 foot.

9. A fluidized bed as defined in claim 1 in which the width of the bed is in excess of approximately 1 foot and further in which the bed includes at least one separator plate extending along the plate to divide the bed into at least two sections with each section having a height/width ratio of between 0.2 and 1.5.

10. A fluidized bed according to claim 4 wherein said deck is generally horizontally disposed.

11. A fluidized bed according to claim 4 wherein said deck is arcuate and concave along its upper sides.

12. A fluidized bed according to claim 1 wherein said openings comprise lift holes configured such that the gas issuing therethrough has predominantly vertical flow components, said holes being interspersed throughout said deck with the holes adjacent said side walls having larger diameters than the remaining holes.

13. A fluidized bed for material mixing utilizing gas jets comprising a deck for receiving the material and having a plurality of openings, side walls for said deck to confine the material received on said deck, means for supplying a gas through said openings and into the area defined by said deck and side walls for fluidizing the material, said openings comprising a plurality of smaller diameter holes covering substantially the entire surface of the deck and at least one row of larger holes extending longitudinally of said deck, said openings being arranged to direct the fluidizing gas in a manner to establish a uniform controlled sprouting pattern and thereby circulate and mix the material.

14. A fluidizing bed for treating granular material with a gas comprising a deck plate having a longitudinal axis, side walls enclosing the deck plate to define an open fluid bed chamber, a plenum chamber underlying the deck plate, means for supplying pressurized gas to the plenum chamber, the deck plate being perforated with a plurality of openings, each of said openings defined by an incision in the deck plate with a portion of the deck plate on one side of the incision being displaced relatively to the deck plate on the opposite side of the incision, each opening being configured to issue a jet of pressurized gas having a substantial flow component lying along the surface of the deck plate, each opening being oriented in a direction at a predetermined angle measured from the longitudinal axis of the deck plate so as to issue its gas jet toward a side wall, said openings lying in at least one row extending along and in spaced relation to a side wall so that each gas jet induces circulation of material from the bottom of the bed outwardly and upwardly along the side wall to provide substantially uniform mixing action and uniform controlling spouting.

15. A fluidized bed for treating granular material with a gas comprising a deck plate having a longitudinal axis, side walls enclosing the deck plate to define an open fluid bed chamber, a plenum chamber underlying the deck plate, means for supplying pressurized air to the plenum chamber, the deck plate being perforated with a plurality of openings, each of said openings defined by an incision in the deck plate with a portion of the deck plate on one side of the incision being displaced relatively to the deck plate on the opposite side of the incision, each opening being configured to issue a jet of pressurized gas having a substantial flow component lying along the surface of the deck plate, each opening being oriented in a direction at a predetermined angle measured from the longitudinal axis of the deck plate so as to issue its gas jet toward a side wall, said openings being arranged in a plurality of rows on said deck plate surface with each row lying in a direction having the same predetermined angle with respect to the longitudinal axis as does each opening, so that gas jets issued by the openings in each row cooperate to induce circulation of material from the bottom of the bed outwardly and upwardly along the side wall to provide substantially uniform mixing action and uniform controlled spouting.

16. A fluidized bed as defined in claim 11 in which said openings are also arranged in a plurality of generally parallel rows extending along and in spaced relation to a side wall.

17. A fluidized bed as defined in claim 10 in which said side walls are generally parallel to each other on opposite sides of said longitudinal axis, and further in which said openings are arranged in a plurality of rows on each side of the longitudinal axis.

18. A fluidized bed as defined in claim 13 in which the openings on each side of the longitudinal axis have the same directional orientation to their respective side wall.

19. A fluidized bed as defined in claim 10 in which the deck plate is curved about its longitudinal axis.

20. A fluidized bed as defined in claim 13 in which the deck plate is generally rectangular and curves upwardly to the opposed side walls from the longitudinal axis.

21. A fluidized bed as defined in claim 10 in which the predetermined angle is greater than 0° and not more than 90°.

* * * * *